No. 754,590. PATENTED MAR. 15, 1904.
J. C. MITCHELL.
NUT LOCK.
APPLICATION FILED JULY 1, 1902.
NO MODEL.
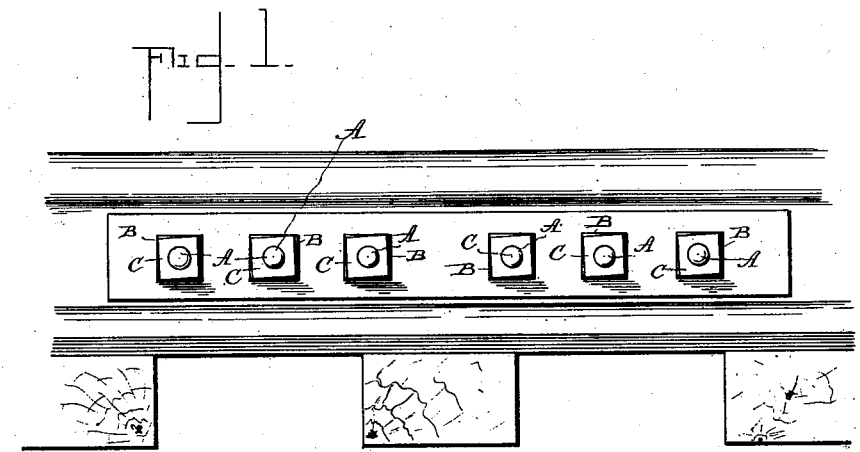
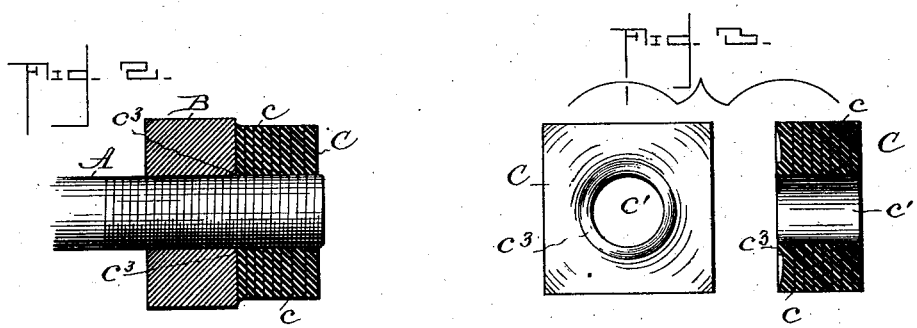
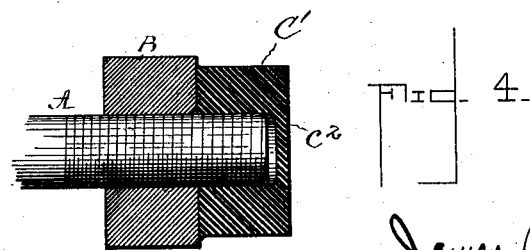
Witnesses
A. J. Beall
F. S. Maguire
James C. Mitchell,
Inventor,
by John B. Thomas & Co.,
Attorneys No. 754,590. Patented March 15, 1904.

UNITED STATES PATENT OFFICE.

JAMES C. MITCHELL, OF LANCASTER, NEW HAMPSHIRE, ASSIGNOR OF THREE-FOURTHS TO MOSES E. HARTFORD AND GILBERT A. MARSHALL, OF LANCASTER, NEW HAMPSHIRE.

NUT-LOCK.

SPECIFICATION forming part of Letters Patent No. 754,590, dated March 15, 1904.

Application filed July 1, 1902. Serial No. 113,928. (No model.)

*To all whom it may concern:*

Be it known that I, JAMES C. MITCHELL, a citizen of the United States, and a resident of Lancaster, in the county of Coos and State of New Hampshire, have invented a Nut-Lock, of which the following is a specification.

Numerous attempts have been made to provide an effective locking device for preventing a nut from working loose upon its bolt, and such attempts have been aimed principally to the provision of a nut-locking device especially adapted for the connecting-bolts of railroad-rails, inasmuch as the constant jar and vibration of the rails by the passing of the cars or rolling-stock acts to very quickly loosen the nuts; but so far as I am aware the devices provided for this purpose have in most instances been ineffective, and where a more or less effective device has been provided the expense of application of same has been such as to forbid its general use.

The primary object of my invention, therefore, is to provide a nut-locking device that shall not only be simple and cheap in construction, but shall serve to effectually and positively lock the nut upon the bolt and so that the nut cannot turn without first removing the improved locking device.

With these objects in view my invention contemplates the provision of a rubber lock-nut in combination with an ordinary bolt and nut, the said rubber lock-nut having a plain opening of slightly-less diameter than the diameter of the bolt at the base of the thread and preferably of slightly-less size than the nut it is designed to lock, the inner face of the rubber lock-nut being such as to closely engage the face of the tightening-nut.

My invention consists, therefore, in the combination, with an ordinary bolt and nut, of a rubber lock-nut having a plain opening of less diameter than the bolt at the base of its thread and having an inner face swelled around the opening whereby the said rubber lock-nut may be screwed upon the bolt, so that the latter will cut therein and when jammed against the nut will be more intimately and firmly clamped upon the bolt to prevent the tightening-nut from turning loose, all as hereinafter fully described, and more specifically set forth in the appended claims.

In the drawings forming a part hereof, Figure 1 is a front elevation showing the application of my invention. Fig. 2 is a sectional view through the parts. Fig. 3 is a detail view of the lock-nut. Fig. 4 is a sectional view of a modification.

Like letters of reference indicate like parts in the several views of the drawings.

Though I have herein shown the application of my invention to the connecting-bolts of railroad-rails, I desire it to be understood that the invention is applicable wherever a nut-locking device may be employed.

Referring to the drawings, A designates the bolt, and B the nut, the latter being herein termed for convenience the "tightening-nut," and these are of the ordinary construction; but in use it is necessary that the threaded end of the bolt project sufficiently beyond the tightening-nut, so as to receive my improved lock-nut.

C designates the lock-nut, which is molded of rubber, preferably with strips of fabric $c$ embedded therein, and is provided with a plain opening $c'$, the diameter of said opening being slightly less than the diameter of the bolt at the base of the thread for the purpose hereinafter explained. This opening in some instances extends clear through the nut and in other instances, as in Fig. 4, extends only partly through to leave a wall $c^2$ at the outer end. The inner face of the lock-nut is rounded at the edge of the opening, forming the bead $c^3$, and beyond said bead is concaved.

In the application of the device the tightening-nut B is first screwed home upon the bolt, after which the rubber lock-nut is turned upon the projecting end of the bolt, so that the thread of the latter will cut thereinto, and when turned tightly against the tightening-nut it will frictionally engage the latter, and the thread of the bolt will be embedded therein. The particular shape of the inner face of the rubber lock-nut provides that when applied the bead $c^3$ will be compressed at the juncture of the nut and bolt and will produce a more intimate engagement of the parts at this point, and consequently greater friction, and the concave provides that the outer edge of the lock-nut will bear more closely against the tightening-nut and prevent moisture or rain from entering between the nuts.

In the modification Fig. 4 the outer end of the opening in the lock-nut $c'$ is closed, so that the wall $c^2$ will exclude water, keeping the threads intact, so that the rubber will not rot at the threads.

The lock-nut is preferably square, and in the application of the same to a bolt a socket-wrench is preferably employed.

It will be readily seen that in use my improved lock-nut will by frictional contact not only closely and securely engage the bolt, but will also frictionally engage the tightening-nut, and that the engagement is such as to firmly hold the lock-nut on the bolt, so as to prevent the tightening-nut from becoming loose. The lock-nut when applied is preferably turned to the position shown—that is, to nearly correspond with the position of the tightening-nut, so as to properly engage the face of the latter and also to shed rain.

The lock-nut may be molded, can be furnished at very little expense, can be quickly applied, and by the particular construction thereof will last a considerable period of time.

Having thus described my invention, I claim—

1. In a nut-lock, the combination with an ordinary bolt and nut, of a rubber lock-nut having a plain opening the diameter of which is less than the diameter of the bolt, the inner face of said rubber lock-nut having a bead at the edge of the opening and a concave beyond said bead, whereby when said lock-nut is turned upon the projecting end of the bolt it will have the thread of the bolt embedded therein and will closely engage the nut, substantially as shown.

2. In a nut-lock, the combination with an ordinary bolt and nut, of a lock-nut composed of rubber and having a plain opening closed at its outer end, said opening being of less diameter than the diameter of the bolt so that the thread of the latter will be embedded therein, a bead at the inner face of the lock-nut surrounding the bolt-opening, and a concave surrounding said bead, as herein shown and described.

In testimony whereof I affix my signature in the presence of two subscribing witnesses.

JAMES C. MITCHELL.

Witnesses:
BERNARD JACOBS,
M. A. HASTINGS.